Sept. 25, 1951  H. FORSSELL  2,569,302
MEANS FOR EXCITING SYNCHRONOUS ALTERNATING
CURRENT MACHINES ACROSS RECTIFIERS
Filed April 4, 1946
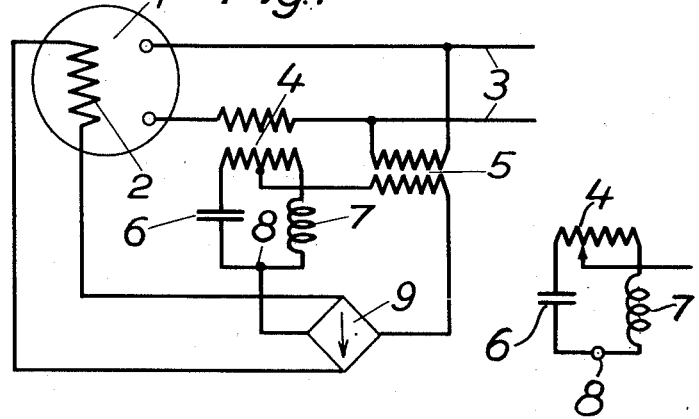
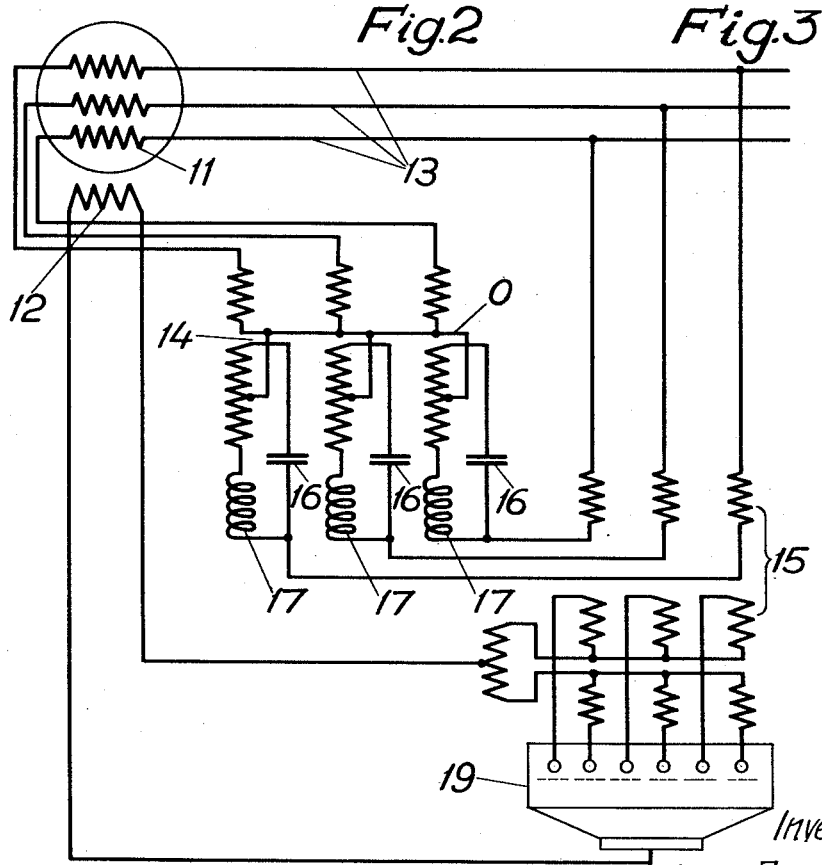

Patented Sept. 25, 1951

2,569,302

UNITED STATES PATENT OFFICE 2,569,302

MEANS FOR EXCITING SYNCHRONOUS ALTERNATING-CURRENT MACHINES ACROSS RECTIFIERS

Harry Forssell, Ludvika, Sweden, assignor to Allmanna Svenska Elektriska Aktiebolaget, Vasteras, Sweden, a Swedish corporation Application April 4, 1946, Serial No. 659,479
In Sweden April 9, 1945

3 Claims. (Cl. 322—25)

For exciting synchronous alternating current machines through rectifiers, it has been found necessary to derive the exciting current from the current as well as from the voltage of the main machine, in order that the excitation shall be maintained also when the said machine is short-circuited, in which case the voltage may sink even to zero, while the current is increased. The connections earlier described for this purpose have been found to suffer from certain disadvantages, for instance they have caused considerable losses of active or reactive power or they have necessitated comparatively complicated installations, for instance switching means for altering the connection on the occasion of a short-circuit. The present invention relates to means for the above specified purpose, which are free from the said inconveniences.

According to the invention, the rectifier serving the excitation is fed by one component depending on the voltage and one component depending on the current by means of a connection, originally presented by Boucherot and comprising resonance members, said connection having the property of deriving from a certain current a voltage proportional thereto or vice versa without consuming any appreciable active or reactive power. The former of the aforesaid two alternative forms is essentially superior to the latter one for the purpose of the present invention for reasons to be specified hereinafter. In practice, it is generally most simple to employ the type of the Boucherot connection in which only a condenser and a reactor are connected to a current transformer winding, each to one end thereof, while the voltage is tapped between the midpoint of said winding and the point of junction between the aforesaid resonance elements.

In the accompanying drawing, Fig. 1 shows a singlephase diagram of connections for the invention, while Fig. 2 shows a threephase diagram of a form which also pays attention to certain practical requirements; and Fig. 3 shows a modification of a part of Fig. 1.

In Fig. 1, 1 designates a singlephase generator having a magnetizing winding 2 and an outgoing line 3. The primary winding of a current transformer 4 is connected in this line, and the primary winding of a voltage transformer 5 is connected between its conductors. The two end terminals of the secondary winding of the current transformer are connected to a condenser 6 and a reactor 7 which are in resonance at the frequency of the generator. The opposite terminals of the condenser and of the reactor are connected together at a point 8. Between this point and the midpoint of the secondary winding of the current transformer there will, according to the theory of the connection described, be a voltage proportional to the current in the said secondary winding, thus to the line current. This voltage is added by direct series connection to the voltage derived from the secondary winding of the voltage transformer 5, and the resultant voltage is impressed on the alternating current terminals of the rectifier 9 which is only diagrammatically indicated, while its direct current terminals are connected to the magnetizing winding 2.

The voltage across the condenser 6 as well as the reactor 7 will be nearly in quarter phase with the current in the current transformer 4, that is, for a purely ohmic load on the generator, also with its voltage. The resultant alternating current voltage impressed on the rectifier will thus, with properly dimensioned devices, differ only very little from the generator voltage. For a purely inductive load on the generator, the voltage tapped from the resonance connection is added to the machine voltage, and for a purely capacitative load, it is subtracted therefrom. The connection thus acts in a compounding sense in normal operation, possibly also for a certain line reactance, if dimensioned herefor. At a short-circuit on the line, when the voltage at the machine terminals breaks down more or less and the current simultaneously rises, the current transformer and the circuit fed thereby can be so dimensioned as to give desired excitation of the generator. As such conditions only prevail during comparatively short periods, it is only necessary to dimension the current responsive members for short time load with full current. If on the other hand corresponding resonance members are fed from the voltage in order to give a current component which could be combined with the machine current, they must be dimensioned for continuous load. Further it is then comparatively difficult to avoid that the current rectifier operating on the strongly inductive exciting winding is exposed to strong overvoltages. For these two reasons a connection transforming current into voltage is considerably to be preferred to one acting in the opposite sense.

In Fig. 2, the threephase alternating current generator is designated by 11 and its exciting winding by 12. The primary windings of the current transformer 14 are here in a manner well known per se connected between the winding phases of the generator and a neutral point 0. To this neutral point, also the midpoints of each one of the secondary windings of the current transformer are connected, while the outer terminals of the said windings are connected to condensers 16 and reactors 17 in analogy with Fig. 1. The junction points between the last-mentioned members are for each phase connected to one terminal of the primary winding of a rectifier transformer 15, the other terminals of which windings are connected to the corresponding line phases 13. The voltages across these transformer windings will thus be composed by the phase voltages of the generator and the voltages across the resonance members 16, 17, which in the case of an ohmic load of the generator are in quarter phase with the former voltages. The secondary winding of the transformer 15 is connected to a rectifier 19 feeding the exciting winding 12. In this connection not only all the windings of the current transformer but also the resonance members connected to its secondary windings are protected against line overvoltages, as they lie close to the common neutral point 0.

As a rule, it is desirable that the induced machine voltage also in the case of a full short-circuit of the machine shall be maintained at the same or nearly the same value as in normal operation, so that the short-circuit current then will be that determined by that voltage and the leakage reactance of the machine. Only with an excitation corresponding to such an induced voltage the machine will be quite prepared to enter into normal function, if the short-circuit ceases, and this is of great importance for avoiding unnecessary interruption of the operation. A thorough examination proves that a dimensioning of the resonance circuit fed by the current, which fills this requirement as regards the excitation at short-circuit, in normal operation will give some overcompounding on the machine terminals, i. e. a somewhat increased voltage there for increased current. The value of this overcompounding will depend in the first line on the curvature of the excitation curve and on the internal voltage drops in the rectifier. The latter should be provided with a grid regulation—or with some regulation equivalent thereto, for instance with a regulation by direct current saturable reactors for smaller units—for regulating by retarding the commutation, within the margin given by the just mentioned dimensioning, the compounding in normal operation (also to negative values) as well as the induced voltage at a short-circuit. In some cases the possibility of compounding to some distant point of the line may cause still some increase of the margin, i. e. of the dimensioning of the resonance circuit, in addition to that required with respect to the short-circuit.

The operation of the resonance coupling proposed by Boucherot is, as known, theoretically based on such a connection that in transforming current to voltage one of the voltage terminals is situated at the midpoint of the current source, for instance the current transformer winding. When no current is tapped between the voltage terminals, the voltages in the two halves of the current transformer will then compensate each other, so that the current transformer does not absorb any voltage. A thorough mathematical examination shows, however, that if in the external voltage circuit there exist voltage drops of mainly inductive type—which is the most common case—these voltage drops preferably should be compensated by placing the voltage tap on the current transformer a little to the side of the midpoint (Fig. 3), and in fact somewhat towards the end connected to the condenser. There may also be a reason for a side displacement of the tap on account of the current harmonics on the alternating current side of the rectifier transformer.

I claim as my invention:

1. Exciting means for a synchronous alternating current machine, comprising an exciting winding therefor, means for creating a voltage substantially proportional to the current of said machine, a condenser in circuit with said voltage creating means substantially compensating the internal voltage drop in said means, a source of voltage proportional to that of said machine, means for connecting said voltage creating means in series with said voltage source, means for rectifying and simultaneously controlling the resultant voltage and for feeding said exciting winding by said rectified voltage, said voltage creating means including a current transformer winding connected in the output circuit of the synchronous machine, and said rectifying and controlling means includes a rectifier connected to a secondary winding of said transformer, said condenser and a reactor being connected in series between the terminals of the secondary winding of said current transformer, a slightly eccentric point between said terminals being connected through said voltage source to one rectifier terminal and a point between said condenser and said reactor being connected to another rectifier terminal.

2. Exciting means for a synchronous alternating current machine, comprising an exciting winding therefor, means for creating a voltage substantially proportional to the current of said machine, said means including a current transformer having a primary winding connected in the output circuit of the machine, a condenser in circuit with said voltage creating means, said condenser and a reactor being connected in series between the terminals of the secondary winding of the current transformer, said condenser substantially compensating the internal voltage drop in said voltage creating means, means for creating a voltage proportional to that of said machine, means for connecting said first named voltage creating means in series with said second named voltage creating means, and means for rectifying and simultaneously controlling the resultant voltage and for feeding the exciting winding by said rectified voltage, said last means including a rectifier, having one of its alternating current terminals connected through said second voltage creating means to a point intermediate the terminals of the secondary winding of said current transformer and having its other alternating current terminal connected to a point between said condenser and said reactor.

3. Exciting means for a synchronous alternating current machine, comprising an exciting winding therefor, reactive means for creating a voltage substantially proportional to the current of said machine, means to feed current to said reactive means, a condenser connected in a series circuit with the voltage creating means, said condenser substantially compensating the internal voltage drop in said voltage creating means, means for creating a voltage proportional to that of said machine, means for connecting said first named voltage creating means in series with said second named voltage creating means, and means for rectifying and simultaneously controlling the resultant voltage and for feeding the exciting winding by said rectified voltage, said last means including a rectifier having one of its alternating current terminals connected through said second voltage creating means to a point of intermediate voltage of the current feeding means, and having its other alternating current terminal connected to a point between said condenser and said first named voltage creating means.

HARRY FORSSELL.

REFERENCES CITED

The following references are of record in the file of this patent:

UNITED STATES PATENTS

| Number | Name | Date |
|---|---|---|
| 1,694,637 | Bethenod | Dec. 11, 1928 |
| 1,857,174 | Zucker | May 10, 1932 |
| 2,407,476 | Crever | Sept. 10, 1946 |

FOREIGN PATENTS

| Number | Country | Date |
|---|---|---|
| 706,650 | Germany | May 31, 1941 |